3,767,769
EXTRACTION OF PHOSPHORIC ACID AT SALINE SOLUTIONS STATE

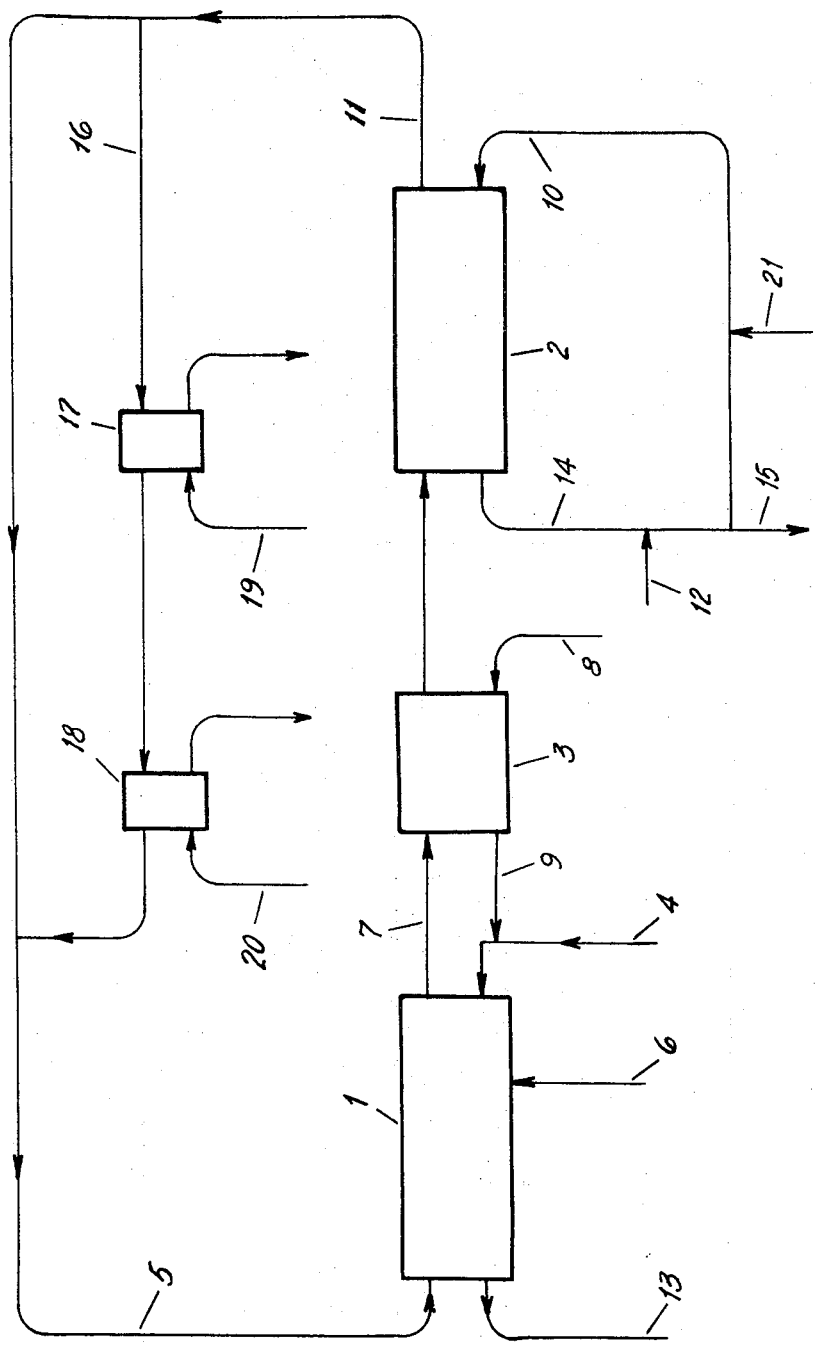

Louis M. Winand, Ris-Orangis, and Jean R. Goret, Paris, France, assignors to Produits Chimiques Pechiney-Saint-Gobain, Neuilly-sur-Seine, France, and UCB (Union Chimique-Chemische Bedrijven), Saint-Gilles, les Brussels, Belgium, fractional part interest to each
Continuation of abandoned application Ser. No. 779,452, Nov. 27, 1968. This application July 7, 1971, Ser. No. 160,508
Claims priority, application France, Nov. 30, 1967, 130,359
Int. Cl. C01b *15/16, 25/26*
U.S. Cl. 423—309    11 Claims

ABSTRACT OF THE DISCLOSURE

A continuous process for extracting alkali phosphates as concentrated, pure solutions derived from the acidic attack on natural rock comprising in that in a first series of countercurrent flow extractors impure solutions of phosphoric acid are treated with a solvent while a strong acid is introduced at one or more points in the first series of extractors, extracting the solution of phosphoric acid in said solvent in countercurrent flow with aqueous solutions containing phosphate ions and alkali ions within a second series of countercurrent flow extractors, first washing and partially extracting the solution of phosphoric acid in said solvent with a stream of pure water in a third series of countercurrent flow extractors, adding the water stream loaded with phosphoric acid to the starting impure solutions of phosphoric acid in the first series of extractors, recycling the solvent leaving the second series of extractors to the first series of extractors, collecting exhausted solutions of phosphoric acid containing the strong acid which has been added at the outlet of the first series of extractors, and collecting pure alkali phosphates as concentrated solutions at the outlet of the second series of extractors.

---

This application is a continuation of Ser. No. 779,452, Nov. 27, 1968, now abandoned.

This invention relates to a continuous process for solvent extraction of phosphoric acid for the production of pure concentrated solutions of alkali phosphates.

For the most part, phosphoric acid extracted from natural phosphate rock is mainly destined for the fertilizer industry whereby the numerous impurities present are not only not disadvantageous but, in the case of certain impurities, are advantageous because they introduce elements essential to vegetation.

A phosphoric acid of much greater impurity becomes desirable when the acid itself, its salts or derivatives are destined for use in a pharmaceutical composition, alimentation or detergent compositions. It is possible to prepare a practically pure phosphoric acid by combustion of phosphorus. It is also possible and of greater commercial value to use solvents for extracting the acid from impure solutions, such as obtained by acidic attack on natural rock for use in the fertilizer industry. For this purpose, numerous processes based upon the use of various solvents, such as acid amines, alcohols and alkyl derivatives of phosphoric acid, have been suggested because of their stability, non-volatility and insolubility in water.

In our earlier French patent application, PV No. 106,037, filed May 11, 1967, and entitled "Improved Continuous Process for the Purification of Phosphoric Acid by Solvents," description is made of a means by which almost all of the phosphoric acid in the impure solution, resulting from acidic attack on natural rock, is extracted in the pure state by solvents. The essence of the process resides in the use of a strong acid, such as sulphuric acid, added to the extraction system into which the impure phosphoric acid and the selected solvent have been introduced.

Industrial reduction to practice of the aforementioned process requires the use of a rather large number of stages in order that the phosphoric acid, dissolved in the selected solvent, be re-extracted by countercurrent flow with water. Moreover, the purified acid which is obtained is still too dilute to enable its salts directly to be obtained in the solid state by crystallization, drying or spray drying without the use of supplementary concentration equipment.

We have found a novel continuous process for the solvent extraction of phosphoric acid in a ratio which exceeds 90% wherein the described drawbacks are avoided and concentrated, pure solutions of alkali phosphate are secured directly at the outlet of the counter-flow extraction equipment and which makes use of a small number of stages.

It is an object of this invention to provide a continuous process of the type described.

Briefly described, the process of this invention consists in that, in a first series of countercurrent flow extractions, solutions of phosphoric acid are treated with a solvent, preferably in the group of alkyl derivatives of phosphoric acid and more preferably tributyl phosphate or triisobutyl phosphate. A strong acid, such as sulphuric acid, is added at one or several stages to the first series of extractors and in a second series of countercurrent flow extractors, the solution of phosphoric acid is extracted in countercurrent flow with aqueous solutions containing phosphate ions and alkali ions, preferably after the solution of phosphoric acid in said solvent has previously been washed and partially extracted in a third series of countercurrent flow extractors with a pure water stream, in which the stream, now loaded with phosphoric acid, is returned to the starting impure solutions of phosphoric acid in the first series of extractors. The solvent leaving the second series of extractors, preferably after purification, is returned to the first series of extractors and, at the outlet of the first series of extractors, exhausted solutions of phosphoric acid containing the strong acid which has been added are collected and at the outlet of the second series of extractors, pure alkali phosphates are collected as a concentrated solution.

The concentrated, pure solutions of alkali phosphates, prepared in accordance with the practice of this invention, the phosphates derived from these solutions, as well as the applications of the alkali phosphates and their derivatives likewise constitute a novel and industrial product of this invention.

More specifically, it has been found that the operation of the second series of extractors is less disturbed by the manifestations of secondary phenomena, such as the formation of emulsions, if the solvent leaving a second series of extractors is purified by the combination of an alkaline wash and an acid wash.

It has been likewise found that in order to avoid such emulsification, it is preferred that the aqueous liquors of the re-extraction, containing phosphate ions and alkaline ions, be distinctly acid. In industrial practice, it is advantageous that the quantity of alkaline ions present to the quantity of phosphate ions not exceed substantially the quantity corresponding to a monoalkali phosphate.

Solely for the purpose of illustration of the process of this invention, without limitation, there is hereinafter described a complete example of the industrial manufacture of pure sodium phosphate destined to be converted to sodium tripolyphosphate, using as a starting material impure phosphoric acid obtained by the attack of phosphoric acid on natural phosphate rock. It should be understood that in complete industrial practice the operations provided for the process of the present invention include various supplementary operations known per se which are not included in the example in order better to illustrate the manner of carrying out the process and the importance, insofar as the preparation of pure salts is concerned, as well as the upgrading of the by-products.

EXAMPLE

Sodium carbonate is added to solutions of crude phosphoric acid resulting from the reaction of sulphuric acid with natural phosphate rock to eliminate the greatest portion of fluosilicic acid that is present. Thereafter sulphuric acid is added so that the soluble calcium sulphate still present will be insolubilized as gypsum and active carbon is added for decolorization. The resulting suspension is filtered to yield an acid solution containing 34% $P_2O_5$ and various impurities which, on the basis of $P_2O_5$, are as follows:

|    | P.p.m. |
|----|--------|
| Fe | 4,660  |
| Al | 5,190  |
| Cr | 698    |
| Mn | 64     |
| Ca | 1,500  |
| Ma | 7,140  |
| V  | 74     |
| As | 30     |
| F  | 7,500  |

This solution also contains a quantity of sulphuric acid corresponding to 9% $SO_4$, based on $P_2O_5$.

Reference will now be made to the drawing for description of the process for treating this solution as described above and which is carried out at a temperature of 50° C.

The battery 1 of ten countercurrent flow extractors is fed with the partially purified phosphoric acid having the above identified composition at a rate of 10 m.³/hr. through line 4. The battery is also fed through line 5 with pure tributyl phosphate at a rate of 140 m.³/hr. 600 kg./hr. of 98% sulphuric acid is fed through line 6 to the seventh stage of the battery 1. The tributyl phosphate, loaded with phosphoric acid, reaches the battery 1 through line 7 and enters battery 3 of four extractors for washing and for partial extraction of phosphoric acid by a stream of pure water fed at a rate of 4.5 m.³/hr. through line 8. This wash solution, containing a part of the phosphoric acid, reaches battery 3 through line 9 and is added to the solution of impure acid to be treated introduced through line 4.

The stream of tributyl phosphate, loaded with the remaining phosphoric acid which is, however, in the purified state, leaves battery 3 and enters battery 2 which has three stages and wherein it is brought into contact with a concentrated 40% solution of monosodium phosphate introduced through line 10 at a rate of 80 m.³/hr. From battery 2, the exhausted tributyl phosphate is returned through line 11 to battery 1 after continuous purification by withdrawal of 14 m.³/hr. through line 16 which, in two extractors 17 and 18 installed in series, is treated countercurrently first with a 0.5 N caustic soda solution from line 19 and then with a 0.5 N nitric acid solution from line 20.

From battery 1 solution of exhausted acid leaves through line 13 having a titer of approximately 2.5% $P_2O_5$ which, in addition, contains all of the added sulphuric acid as well as the metal impurities.

The saline solution leaving battery 2 through line 14, having a pH of about 2.5, is partially neutralized with sodium carbonate introduced through line 12 until the ratio of Na/P corresponding to monosodium phosphate is reached, and then contains 45% of this salt.

Stream 15, which represents the production destined for the manufacture of sodium tripolyphosphate after decolorization, is withdrawn at a rate of 11.5 m.³/hr. Water is added through line 21 to the remaining stream to readjust its concentration back to 40% monosodium phosphate for return through line 10 to battery 2 at a rate of 80 m.³/hr.

Phosphoric acid is extracted at a rate of 94% in this example and the analysis of the impurities of the salt obtained is as followed, based upon $P_2O_5$:

|        | P.p.m. |
|--------|--------|
| Fe     | 20     |
| Al     | <3     |
| Cr     | <5     |
| Mn     | <2     |
| Ca     | <20    |
| Mg     | <20    |
| V      | <4     |
| As     | 32     |
| $SO_4$ | 4,000  |
| P      | 2,100  |

Furthermore, the exhausted acid in stream 13 can be subjected to an extraction treatment with solvents when justified by the presence of certain values ascribed to the rare earths, yttrium, and other metals contained therein. In addition, to improve the economics of the process, the stream 13 which contains all of the added sulphuric acid may be used for washing the gypsum cake derived from the filtration of the pulps obtained by the attack on the natural phosphate rock, especially when manufacture of fertilizers is combined with the manufacture of the pure salts of phosphoric acid.

It will be understood that this example is not intended to limit the present invention and that it is possible, in an analogous manner, to manufacture other salts, such as the potassium salts or the ammonium salts of phosphoric acid which have important industrial applications.

It will be further understood that changes may be made in the details of formulation and operation without departing from the spirit of the invention, especially as defined in the following claims.

We claim:

1. A continuous process for extracting alkali phosphates as concentrated, pure solutions derived from acid attack on phosphate rock comprising the steps of contacting an impure solution of phosphoric acid in a first series of countercurrent flow extractors with an alkyl phosphate solvent in the presence of sulfuric acid introduced to the first series of extractors at one or more points to extract phosphoric acid with the alkyl phosphate solvent, passing the solvent containing phosphoric acid to a second series of countercurrent flow extractors in which the solvent containing the phosphoric acid is washed with water, passing the washed solvent containing phosphoric acid to a third series of countercurrent flow extractors and contacting the washed solvent containing phosphoric acid with an aqueous solution of alkali ions in which the ions are selected from the group consisting of the cation of an alkali metal and ammonium to convert the phosphoric acid to the corresponding alkali metal phosphate, and recovering the alkali phosphate from the solvent.

2. The process as claimed in claim 1 which includes the step of recycling the alkyl phosphate from the third series of extractors to the first series of extractors.

3. The process as claimed in claim 1 which includes the step of passing the wash water containing phosphoric acid form the second series of extractors to the first series of extractors for removal of phosphoric acid therefrom.

4. The process as claimed in claim 1 in which the solvent is an alkyl derivative of phosphoric acid.

5. The process as claimed in claim 1 in which the solvent is tributyl phosphate.

6. The process as claimed in claim 1 in which the solvent is triisobutyl phosphate.

7. The process as claimed in claim 1 which includes the step of purifying the solvent leaving the second extractors by a solution of caustic soda.

8. The process as claimed in claim 1 which includes the step of purifying the solvent leaving the second series of extractors with nitric acid solution.

9. The process as claimed in claim 1 which includes the step of extracting metals such as rare earths and yttrium from the exhausted solutions of phosphoric acid from the first series of reactors containing the strong acid which has been added.

10. The process as claimed in claim 9 in which the extraction is carried out in a solvent.

11. The process as claimed in claim 1 in which the solution resulting from the acidic attack of the phosphate rock is pretreated with sodium carbonate and sulphuric acid followed by filtration to produce a gypsum cake and which includes the step of washing the gypsum cake with the exhausted solution of phosphoric acid containing sulphuric acid which has been added.

References Cited

UNITED STATES PATENTS

| | | | |
|---|---|---|---|
| 3,410,656 | 11/1968 | Bunin et al. | 23—165 |
| 3,375,068 | 3/1968 | Frohlich et al. | 23—165 |
| 3,479,139 | 11/1969 | Koerner | 23—165 |
| 3,110,556 | 11/1963 | Peppard et al. | 23—23 |
| 3,409,415 | 11/1968 | Moore | 23—340 |
| 3,375,068 | 3/1968 | Frohlich et al | 23—165 |
| 3,556,739 | 1/1971 | Baniel et al. | 23—312 P |
| 3,573,005 | 3/1971 | Baniel et al. | 23—312 P |

OSCAR R. VERTIZ, Primary Examiner

G. A. HELLER, Assistant Examiner

U.S. Cl. X.R.

23—312 P; 423—321